United States Patent
Khan et al.

(10) Patent No.: US 7,886,165 B2
(45) Date of Patent: Feb. 8, 2011

(54) POWER MANAGEMENT FOR POWER-OVER-ETHERNET-CAPABLE SWITCH

(75) Inventors: Umer Khan, Irvine, CA (US); Kenneth E. Venner, Las Flores, CA (US)

(73) Assignee: Broadcom Corporation, Irvine, CA (US)

( * ) Notice: Subject to any disclaimer, the term of this patent is extended or adjusted under 35 U.S.C. 154(b) by 785 days.

(21) Appl. No.: 11/752,952

(22) Filed: May 24, 2007

(65) Prior Publication Data

US 2008/0294917 A1   Nov. 27, 2008

(51) Int. Cl.
    *G06F 1/26* (2006.01)
(52) U.S. Cl. ............... 713/300; 713/310; 713/320; 713/321; 713/324; 713/330
(58) Field of Classification Search ......... 713/300, 713/320, 322, 310, 321, 324, 330
    See application file for complete search history.

(56) References Cited

U.S. PATENT DOCUMENTS

| | | | | |
|---|---|---|---|---|
| 5,319,571 A * | 6/1994 | Langer et al. | ............... | 713/300 |
| 5,381,554 A * | 1/1995 | Langer et al. | ................ | 714/14 |
| 5,717,934 A * | 2/1998 | Pitt et al. | ................... | 713/330 |
| 6,535,983 B1 * | 3/2003 | McCormack et al. | ....... | 713/310 |
| 7,155,622 B2 * | 12/2006 | Mancey et al. | ............. | 713/324 |
| 7,225,345 B2 * | 5/2007 | Korcharz et al. | ............ | 713/300 |
| 7,400,062 B2 * | 7/2008 | Pincu et al. | .................. | 307/29 |
| 7,406,365 B2 * | 7/2008 | Pratt et al. | ................... | 700/295 |
| 7,478,251 B1 * | 1/2009 | Diab et al. | .................... | 713/300 |
| 7,631,201 B2 * | 12/2009 | Hansalia | .................... | 713/300 |
| 2003/0065958 A1 * | 4/2003 | Hansen et al. | .............. | 713/300 |
| 2003/0107269 A1 * | 6/2003 | Jetzt | ............................. | 307/4 |
| 2004/0133814 A1 * | 7/2004 | Lavoie et al. | ............... | 713/300 |
| 2005/0229016 A1 * | 10/2005 | Addy | .......................... | 713/300 |
| 2005/0272402 A1 * | 12/2005 | Ferentz et al. | ............. | 455/402 |
| 2006/0112288 A1 * | 5/2006 | Schindler | ..................... | 713/300 |
| 2006/0242458 A1 * | 10/2006 | Feldman et al. | ................ | 714/14 |
| 2006/0259792 A1 * | 11/2006 | Dove | .......................... | 713/300 |
| 2007/0260904 A1 * | 11/2007 | Camagna et al. | ............ | 713/310 |
| 2008/0052546 A1 * | 2/2008 | Schindler et al. | ............ | 713/300 |
| 2009/0172430 A1 * | 7/2009 | Takenouchi | .................. | 713/310 |

* cited by examiner

*Primary Examiner*—Thomas Lee
*Assistant Examiner*—Zahid Choudhury
(74) *Attorney, Agent, or Firm*—Fiala & Weaver P.L.L.C.

(57) ABSTRACT

A system and method is described that allows a PoE-capable switch to selectively provide power to one or more remote devices in an instance where power being supplied to the switch itself is limited or failing. In one embodiment, the switch receives a notification from an uninterruptable power supply (UPS) and, in response to receiving the notification, selectively provides power to one or more devices powered by the switch. Selectively providing power to one or more of the devices may include providing power to only a subset of the devices, providing a different amount of power to different ones of the devices, or providing power for different durations to different ones of the devices. In an alternate embodiment, in response to receiving the notification, the switch communicates with a remote device and causes the remote device to activate at least one power saving feature.

18 Claims, 11 Drawing Sheets

POWER MANAGEMENT FOR POWER-OVER-ETHERNET-CAPABLE SWITCH

BACKGROUND OF THE INVENTION

1. Field of the Invention

The invention generally relates to networks in which power is delivered using Power over Ethernet (PoE) technology. More specifically, the invention is related to a system and method that allows a PoE-capable switch to selectively provide power to one or more remote devices in an instance where the power being supplied to the switch itself is limited or failing.

2. Background

Power over Ethernet (PoE) technology enables the transmission of electric power, along with data, to remote devices over standard twisted-pair cable in an Ethernet network. This technology is commonly used for powering Voice over Internet Protocol (VoIP) telephones, wireless local area network (WLAN) access points, webcams, embedded computers, and other appliances where it would be inconvenient or infeasible to supply power separately. The technology works with an unmodified Ethernet cabling infrastructure. The current industry standard for PoE technology is the IEEE 802.3af standard, although proprietary PoE systems exist as well.

A conventional PoE-capable switch is able to detect whether a device connected to one of its ports is capable of being powered via the Ethernet cable and to supply power to the device accordingly. However, such a switch is not capable of selectively providing power to one or more devices powered by the switch in an instance where the supply of power to the switch is limited or failing. This issue will be further explained with reference to FIG. 1 and FIG. 2.

FIG. 1 illustrates a conventional network system 100 in which a PoE-capable switch 102 is used to transfer data between a local area network 104 and a plurality of remote devices 106, as well as to provide power to those devices. As noted above, each of powered devices 106 may be one of a VoIP telephone, WLAN access point, webcam, embedded computer, or other appliance adapted to receive both data and power via a standard Ethernet cable. In network system 100, switch 102 is powered by AC power supplied by a local utility. When the AC power supply to switch 102 is shut off, as in the case of a power outage, switch 102 will shut down, thereby also depriving devices 106 of power. This may be extremely disruptive to the users of devices 106. For example, in an instance where a device 106 is a VoIP telephone, loss of power in this manner may lead to the unexpected termination of an active telephone conversation.

A conventional method for dealing with the foregoing issue is to place an uninterruptable power supply (UPS) between the utility power supply and the PoE-capable switch. Such an approach is depicted in network system 200 of FIG. 2. As shown in FIG. 2, a UPS 208 has been connected between the utility power supply and PoE-capable switch 102. In an instance where the utility power supply is shut off, UPS 208 can provide battery-supplied power to switch 102 until AC power from the utility is restored or until the UPS battery or batteries are depleted, whichever occurs first. Consequently, switch 102 can continue to provide power to devices 106 at least until the battery-supplied power runs out.

However, during the time that switch 102 is running off of UPS battery power, switch 102 is not aware that the utility power supply has failed and that the UPS batteries are now the primary source of power. As a result, switch 102 continues to provide power to all devices 106, whether such devices are critical or non-critical, as it normally would. By consuming power in this fashion, switch 102 and all devices 106 do not stay up very long. Furthermore, when power runs out, switch 102 and all devices 106 (whether critical or not) turn off simultaneously and without regard to priority. Where switch 102 requires a large power supply, the only way to avoid these issues is to install a very large UPS and optionally a generator between the utility power supply and switch 102, such that secondary power can be provided to switch 102 even during very long power outages. This is a costly proposition.

The issue of managing power delivered to a PoE switch that then delivers power to devices at the edge of network is becoming a critical one. This is due to rapid growth in the deployment of IP telephones, wireless access points, video cameras, and other devices that leverage PoE capabilities. This problem will be exacerbated in the future as more and more devices and systems are designed that rely on PoE technology. In accordance with the current 802.3af standard, 48 volts of DC power are provided over two out of four available pairs on a Category 3/Category 5 Ethernet cable with a maximum current of 400 milliamperes for a maximum load power of 15.4 watts. However, a future standard, commonly referred to as PoE+, is presently under development. This draft standard describes extending PoE technology by using all four pairs of standard Ethernet Category 5 cable to provide up to 56 watts of power. The higher power available with this future standard should make it possible to provide power to equipment with higher power requirements, such as WiMAX transmitters, pan-tilt-zoom cameras, IP-videophones and thin clients.

What is needed, then, is a system and method that would allow a PoE-enabled Ethernet switch to receive a notification from a UPS that a primary power source has failed such that the switch can selectively provide power to one or more of devices powered by the switch during the time that switch is running off of a secondary power source. For example, it would be beneficial if such a switch could selectively provide power to only those powered devices that are deemed critical and reduce or turn off power to those powered devices that are deemed non-critical in response to receiving such a notification from the UPS. This would allow the switch to provide power to the critical devices for a longer period of time in a manner that does not require investment in a larger, more expensive secondary power source.

BRIEF SUMMARY OF THE INVENTION

The present invention provides a system and method that allows a PoE-capable switch to selectively provide power to one or more remote devices in an instance where power being supplied to the switch itself is limited or failing. In one embodiment of the present invention, the switch receives a notification from an uninterruptable power supply (UPS) that a primary power source has failed and, in response to receiving the notification, selectively provides power to one or more devices powered by the switch during the time that switch is running off of a secondary power source.

For example, in one embodiment of the present invention, the switch selectively provides power to only powered devices that are deemed critical and reduces or turns off power to powered devices that are deemed non-critical in response to receiving the notification from the UPS. This allows the switch to provide power to the critical devices for a longer period of time in a manner that does not require investment in a larger, more expensive secondary power source. Other methods for selectively providing power to the powered devices are described herein.

In particular, an embodiment of the present invention is a method for performing power management by a PoE-capable switch. The PoE-capable switch is connected to a plurality of remote devices over respective Ethernet cables and is operable to provide both data and power to each of the plurality of remote devices over the same Ethernet cable. The method includes receiving a notification indicating that a power source of the PoE-capable switch is limited or failing, and responsive to receiving the notification, selectively providing power to one or more of the plurality of remote devices connected to the PoE-capable switch.

Receiving the notification may include receiving a notification from an uninterruptable power supply (UPS). Selectively providing power to one or more of the plurality of remote devices connected to the PoE-capable switch may include providing power to only a subset of the plurality of remote devices connected to the PoE-capable switch, providing a different amount of power to different ones of the plurality of remote devices connected to the PoE-capable switch, and/or providing power for different durations to different ones of the plurality of remote devices connected to the PoE-capable switch. Selectively providing power to one or more of the plurality of remote devices connected to the PoE-capable switch may be based on preconfigured data associated with one or more ports of the PoE-capable switch and/or on state information associated with one or more of the remote devices.

Another embodiment of the present invention is a PoE-capable switch. The PoE-capable switch includes a plurality of ports, PoE logic connected to the plurality of ports, control logic connected to the PoE logic, and a data interface connected to the control logic. Each of the plurality of ports is adapted for connection to a remote device via a respective Ethernet cable. The PoE logic is controllable to provide power to selected ones of the plurality of ports for delivery to a remote device connected thereto. The control logic is configured to control the operation of the PoE logic. The data interface is configured to receive a notification indicating that a power source of the PoE-capable switch is limited or failing. The control logic includes power management logic that is configured to control the PoE logic to selectively provide power to the plurality of ports responsive to receipt of the notification by the data interface.

The data interface may comprise a wired interface, such as an RS232 interface, a universal serial bus (USB) interface, or an Ethernet interface, a wireless interface such as any IEEE 802.11 interface or a Bluetooth® interface, or any other standard or proprietary wired or wireless interface. The power management logic may be configured to control the PoE logic to provide power to only a subset of the plurality of ports, to provide a different amount of power to different ones of the plurality of ports, and/or to provide power for different durations to different ones of the plurality of ports. The power management logic may be configured to control the PoE logic to selectively provide power to the plurality of ports based on preconfigured data associated with one or more of the plurality of ports and/or on state information associated with one or more of remote devices connected to the plurality of ports. In an alternate embodiment, the power management logic resides in an external server communicatively connected to the PoE-capable switch or is distributed among the external server and the PoE-capable switch.

A further embodiment of the present invention is a method for performing power management by a PoE-capable switch. The PoE-capable switch is connected to a plurality of remote devices over respective Ethernet cables and is operable to provide both data and power to each of the plurality of remote devices over the same Ethernet cable. The method includes receiving a notification indicating that a power source of the PoE-capable switch is limited or failing and, responsive to receiving the notification, communicating with a selected one of the remote devices to indicate to the selected remote device to implement at least one power saving feature supported by the selected remote device. Receiving the notification may include receiving a notification from an uninterruptable power supply (UPS).

A still further embodiment of the present invention is a PoE-capable switch. The PoE-capable switch includes a plurality of ports, PoE logic connected to the plurality of ports, control logic connected to the PoE logic, and a data interface connected to the control logic. Each of the plurality of ports is adapted for connection to a remote device via a respective Ethernet cable. The PoE logic is controllable to provide power to selected ones of the plurality of ports for delivery to a remote device connected thereto. The control logic is configured to control the operation the PoE logic. The data interface is configured to receive a notification indicating that a power source of the PoE-capable switch is limited or failing. The control logic includes power management logic that is configured to communicate with a remote device connected to one of the plurality of ports to indicate to the remote device to implement at least one power saving feature supported by the remote device responsive to receipt of the notification by the data interface.

The data interface may be a wired interface, such as an RS232 interface, a universal serial bus (USB) interface, or an Ethernet interface, a wireless interface such as any IEEE 802.11 interface or a Bluetooth® interface, or any other standard or proprietary wired or wireless interface. In an alternate embodiment, the power management logic resides in an external server communicatively connected to the PoE-capable switch or is distributed among the external server and the PoE-capable switch.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
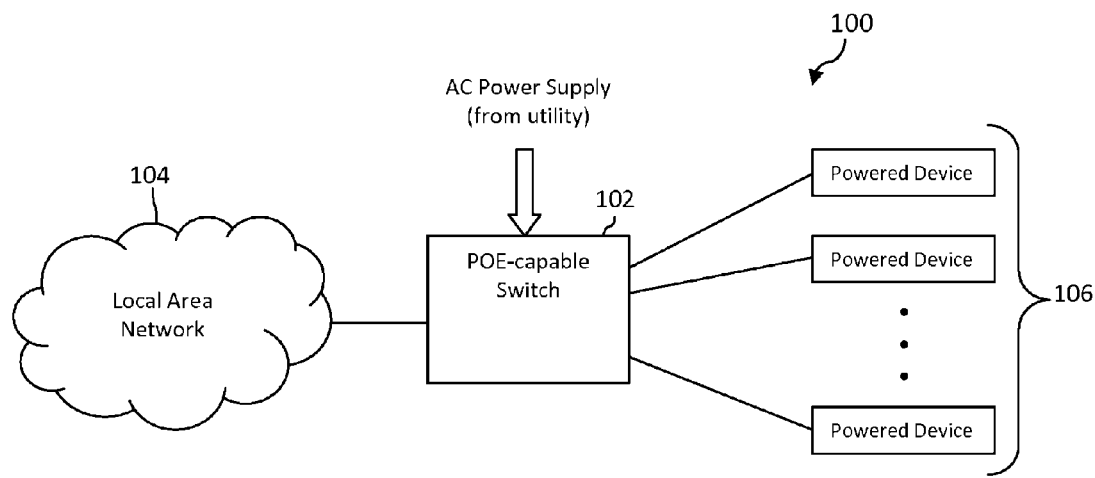
FIG. 1 is a block diagram of a prior art network system in which a Power over Ethernet (PoE)-capable Ethernet switch is powered by utility-supplied AC power.
Figure 2:
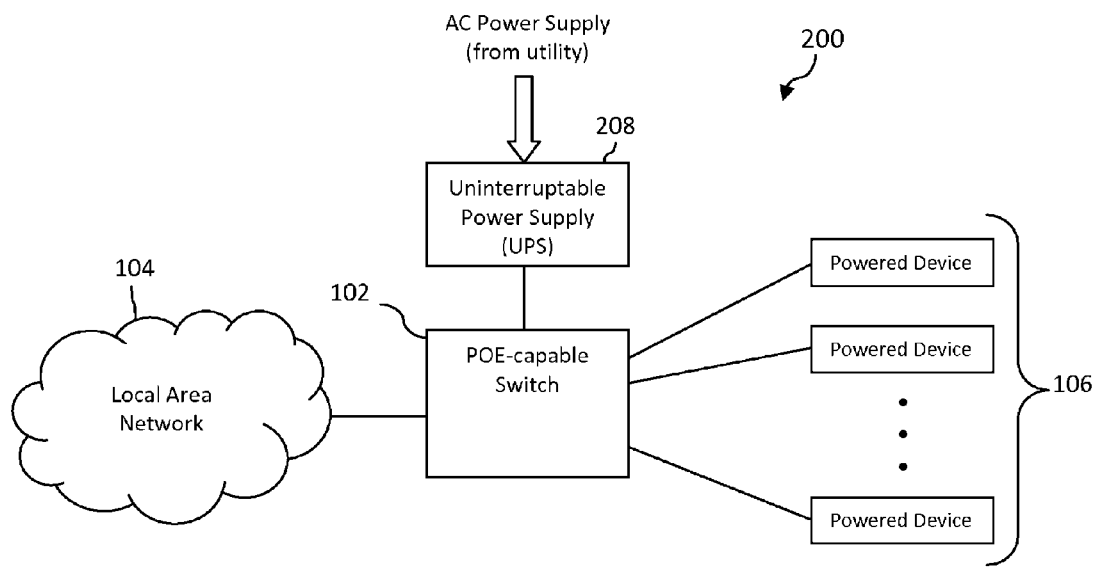
FIG. 2 is a block diagram of a prior art network system in which a PoE-capable switch is powered primarily by an uninterruptable power supply (UPS).

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Figure 3:
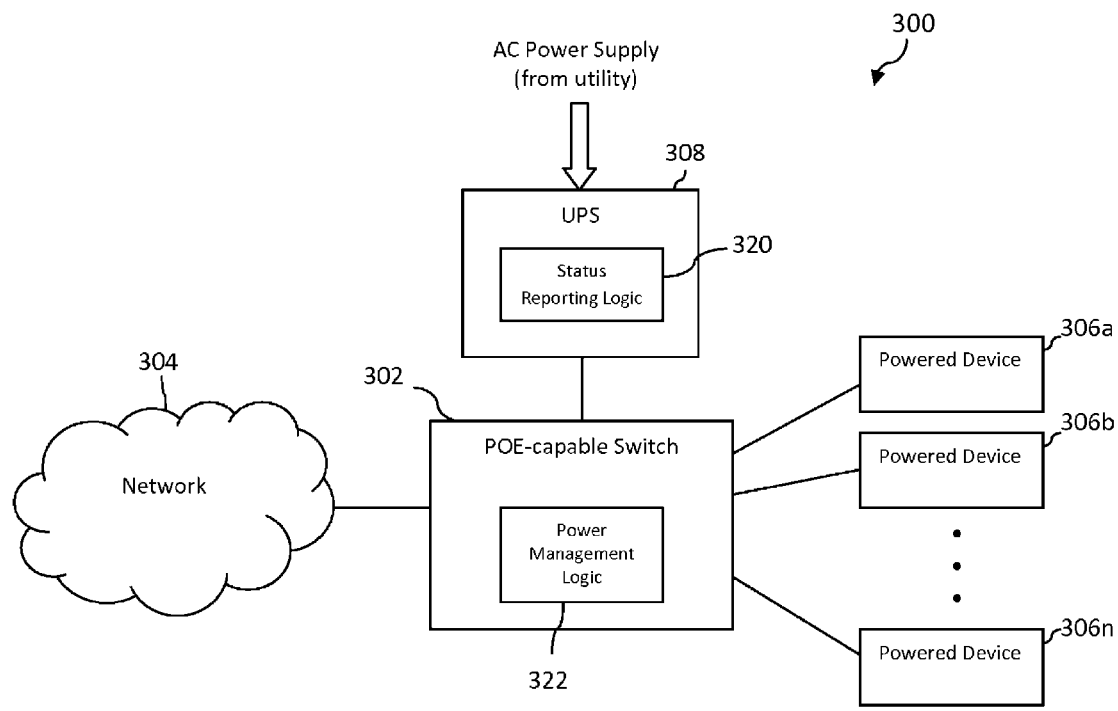
FIG. 3 is a block diagram of a network system in accordance with an embodiment of the present invention.

A. Example Network System in Accordance with an Embodiment of the Present Invention FIG. 3 depicts a block diagram of a network system 300 in accordance with an embodiment of the present invention. As shown in FIG. 3, network system 300 includes a PoE-capable switch 302 that is communicatively connected to a network 304 and a plurality of remote devices 306a-306n. In an embodiment, network 304 comprises a local area network (LAN). However, the invention is not limited to LANs, and network 304 may comprise any type of data communication network that is capable of communicating with a PoE-capable switch.

PoE-capable switch 302 is connected to each of devices 306a-306n via a separate Ethernet cable. PoE-capable switch 302 is adapted to transfer data between network 304 and each of devices 306a-306n in a well-known manner, as well as to provide power to each of devices 306a-306n via the same Ethernet cable that is used for providing data thereto. In one embodiment, PoE-capable switch 302 is designed to provide power to devices 306a-306n in a manner that is compliant with the IEEE 802.3af standard. However, the invention is not limited to IEEE 802.3af-compliant systems. Rather, the present invention may be used in any network system in which both power and data are provided over an Ethernet cable, including but not limited to proprietary PoE systems or systems that comply with a future IEEE standard that builds on or supersedes the IEEE 802.3af standard.

Each of remote devices 306a-306n is configured to receive both data and power from PoE-capable switch 302. Each remote device may be any one of a variety of devices that are designed for use in a PoE system, including but not limited to Voice over Internet Protocol (VoIP) telephones, wireless local area network (WLAN) access points, webcams, embedded computers, WiMAX transmitters, pan-tilt-zoom cameras, IP-videophones, thin clients, or laptop computers. Remote devices 306a-306n may represent a subset of the remote devices attached to PoE-capable switch 302. In other words, there may be other remote devices (not shown in FIG. 3) that are connected to switch 302 but are not capable of receiving power therefrom. Such devices would have their own local power supplies and therefore would not participate in the improved power management scheme described herein.

As also shown in FIG. 3, PoE-capable switch 302 is further connected to an uninterruptable power supply (UPS) 308. UPS 308 is adapted to supply power to switch 302 from a primary power source when the primary power source is available and to switch to supplying power to switch 302 from a secondary power source when the primary power source becomes unavailable. In system 300, the primary power source is utility-supplied AC power while the secondary power source is one or more batteries internal to UPS 308. However, this example is not intended to limit the present invention and other and/or additional power sources may be used by UPS 308 to provide power to switch 302. For example, UPS 308 may be further connected to an external power source, such as a generator, battery, or second UPS, and use such external power source when the primary power source or another secondary power source fails.

As is further shown in FIG. 3, UPS 308 includes status reporting logic 320 and switch 302 includes power management logic 322. As will be described in more detail herein, status reporting logic 320 is configured to detect when UPS 308 has switched from supplying power to switch 302 from a primary power source to a secondary power source and, responsive to detecting this, to transmit a notification to switch 302. As also will be described in more detail herein, power management logic 322 is configured to selectively provide power to devices 306a-306n responsive to receipt of the notification by switch 302.

Figure 4:
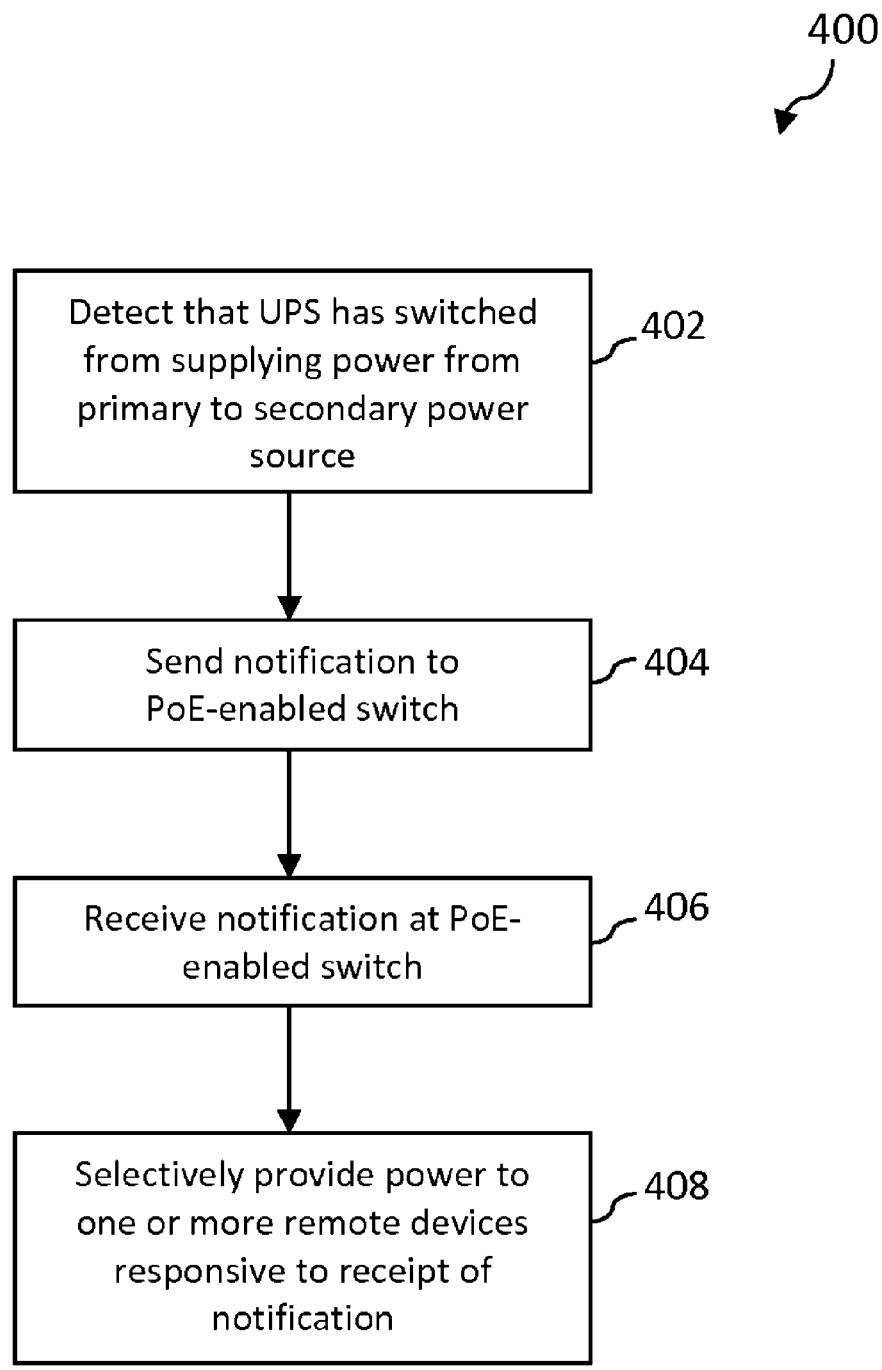
FIG. 4 depicts a flowchart of a method for providing improved power management in a PoE-capable switch in accordance with an embodiment of the present invention.

B. Example Method for Performing Improved Power Management in a PoE-Capable Switch in Accordance with an Embodiment of the Present Invention FIG. 4 illustrates a flowchart 400 of a method for performing improved power management in a PoE-capable switch in accordance with an embodiment of the present invention. The method of flowchart 400 will now be described with further reference to the elements of network system 300, described above in reference to FIG. 3, although the invention is by no means limited to that particular implementation.

As shown in FIG. 4, the method of flowchart 400 begins at step 402 in which status reporting logic 320 of UPS 308 detects that UPS 308 has switched from supplying power to PoE-capable switch 302 from a primary power source, such as utility-supplied AC power, to a secondary power source, such as one or more batteries internal to UPS 308.

At step 404, responsive to detecting that UPS 308 has switched from supplying power from a primary to a secondary power source, status reporting logic 320 transmits a notification to PoE-enabled switch 302. The form and content of this notification will vary depending on the implementation of UPS 308, switch 302, and the interface between them. As will be appreciated by persons skilled in the relevant art(s), UPS 308 and switch 302 may be connected by any of a variety of different interfaces for data communication, including but not limited to wired interfaces such as an RS-232 interface, a USB interface, or an Ethernet interface, wireless interfaces such as a BlueTooth® interface or any IEEE 802.11 interface, or other standard or proprietary wired or wireless interfaces. In one embodiment, the notification is not directly transmitted from UPS 308 to switch 302, but is instead proxied or transmitted through one or more intermediate devices such as one or more servers.

The notification itself may include a very small amount of information, such as an simple indicator signifying that the changeover from primary to secondary power source has occurred, or may include more information, such as but not limited to a time that the changeover occurred, an amount of power remaining in a secondary power source (e.g., the UPS battery or batteries), a predicted time that power from the secondary power source will run out, a predicted time that power from a primary source will come back on, or the like. The notification may be formatted in accordance with any standard or proprietary network protocol, including but not limited to the TCP/IP protocol or SNMP. Where the amount of information to be sent is significant, packet-based communication in accordance with the TCP/IP protocol may advantageously be used to transfer such information from UPS 308 to PoE-capable switch 302, although this is a matter of design choice.

The notification may comprise a single message or a plurality of messages. The notification may also occur as part of a bilateral communication protocol between UPS 308 and switch 302. Furthermore, steps 402 and 404 may be performed automatically by UPS 308 or only in response to a query or message from PoE-capable switch 302 or other network entity. In this instance, PoE-capable switch 302 or the other network entity may be deemed the initiator of the method of flowchart 400.

At step 406, PoE-capable switch 302 receives the notification from UPS 308. As noted above, the form and content of the notification will vary depending on the implementation of UPS 308, switch 302, and the interface between them.

At step 408, power management logic 322 within switch 302 selectively provides power to one or more of remote devices 306a-306n responsive to receipt of the notification by switch 302. As will be described in more detail below, the selective providing of power to one or more of devices 306a-306n by power management logic 322 may include selectively providing power to only a subset of devices 306a-306n, selectively providing different amounts or levels of power to different ones of devices 306a-306n, and/or selectively providing power for different durations to different ones of devices 306a-306n. The determination of which of devices 306a-306n should receive power, the amount of power provided to each device, and the duration over which power is provided to each device may be made by power management logic 322 based on a variety of factors or inputs, which will also be described in more detail below.

C. Selective Providing of Power by a PoE-capable Ethernet Switch in Accordance with an Embodiment of the Present Invention As noted above, power management logic 322 within switch 302 is configured to selectively provide power to one or more of remote devices 306a-306n in response to receipt of a notification from UPS 308 by switch 302. By selectively providing power in this fashion, power management logic 322 is able to reduce the overall power demands on switch 302 during the time when UPS 308 is providing power from the secondary power source. Furthermore, by selectively providing power in this fashion, power management logic 322 is able to use the limited power available from the secondary power source in the most effective way possible.

Figure 5:
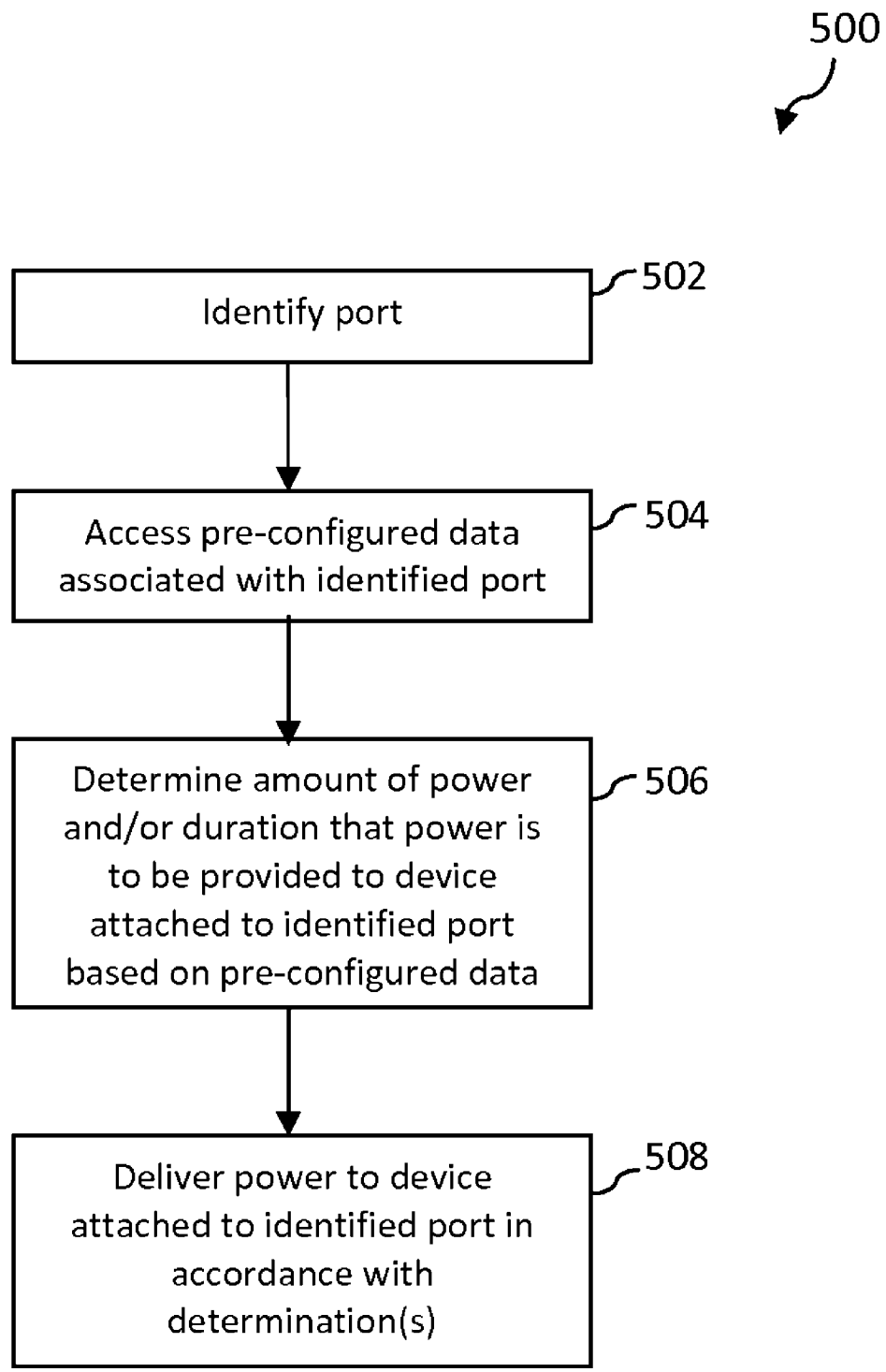
FIG. 5 depicts a flowchart of a method for selectively providing power to one or more remote devices by a PoE-capable switch based on pre-configured data in accordance with an embodiment of the present invention.

FIG. 5 illustrates a flowchart 500 of a method for selectively providing power to one or more remote devices by a PoE-capable switch in accordance with an embodiment of the present invention. In the embodiment depicted in FIG. 5, the power management logic within the PoE-capable switch selectively provides power to the one or more remote devices based on pre-configured data that is associated with each port on the switch. This pre-configured data may be entered by a user and stored in local memory on the switch.

The method of flowchart 500 will now be described with further reference to the elements of network system 300, described above in reference to FIG. 3, although the invention is by no means limited to that particular implementation.

The method of flowchart 500 begins at step 502, in which power management logic 322 within switch 302 identifies a particular port on switch 302. At step 504, power management logic 322 accesses pre-configured data that is associated with the identified port. As noted above, this pre-configured data may have been previously entered by a user and stored in a local memory within switch 302.

At step 506, power management logic 322 determines an amount of power and/or duration that power is to be provided to a device attached to the identified port based on the pre-configured data. With respect to the amount of power to be provided, the pre-configured data may indicate that the remote device is to continue to receive the same amount of power, a lesser amount of power, or no power at all. With respect to the duration that power is to be provided to the device, the pre-configured data may indicate that the device is to continue to receive power until such time as UPS 308 can no longer provide power to switch 302, or may specify a fixed amount of time that the device is to continue to receive power from switch 302.

At step 508, switch 302 delivers power to the remote device attached to the identified port in accordance with the determination(s) made in step 506.

It is to be understood that the method of flowchart 500 could be performed for each port on switch 302 or for only a subset of the ports on switch 302.

The foregoing method of flowchart 500 is advantageous because it allows a user to configure in advance how each port, and therefore each device attached to a port, will be supplied power during the time that UPS 308 is running off of a secondary power source. The user could thus classify a certain port or class of ports as "critical" and ensure that power is delivered to devices attached to those ports even when UPS 308 is running off of a secondary power source while classifying another port or class of ports as "non-critical" such that devices attached to those ports receive less or no power during the same time frame. In this way, switch 302 can both conserve power and provide power to critical devices for a longer period of time.

The pre-configured data associated with each port may expressly specify the amount of power and/or the duration that power is to be provided to an attached device. Alternatively, the preconfigured data may indicate a class or priority level for the port, which is then mapped by power management logic 322 to a particular amount of power and/or duration that power is to be provided to the attached device. In a still further embodiment, power management logic 322 is configured to take into account other or additional pre-configured data associated with the port, such as the type of device attached to the port and the power draw of the device attached to the port, to intelligently determine the amount of power and/or the duration that power is to be provided to a device attached to the port. Depending on the implementation, the user configuration can be very high-level or granular in nature.

Figure 6:
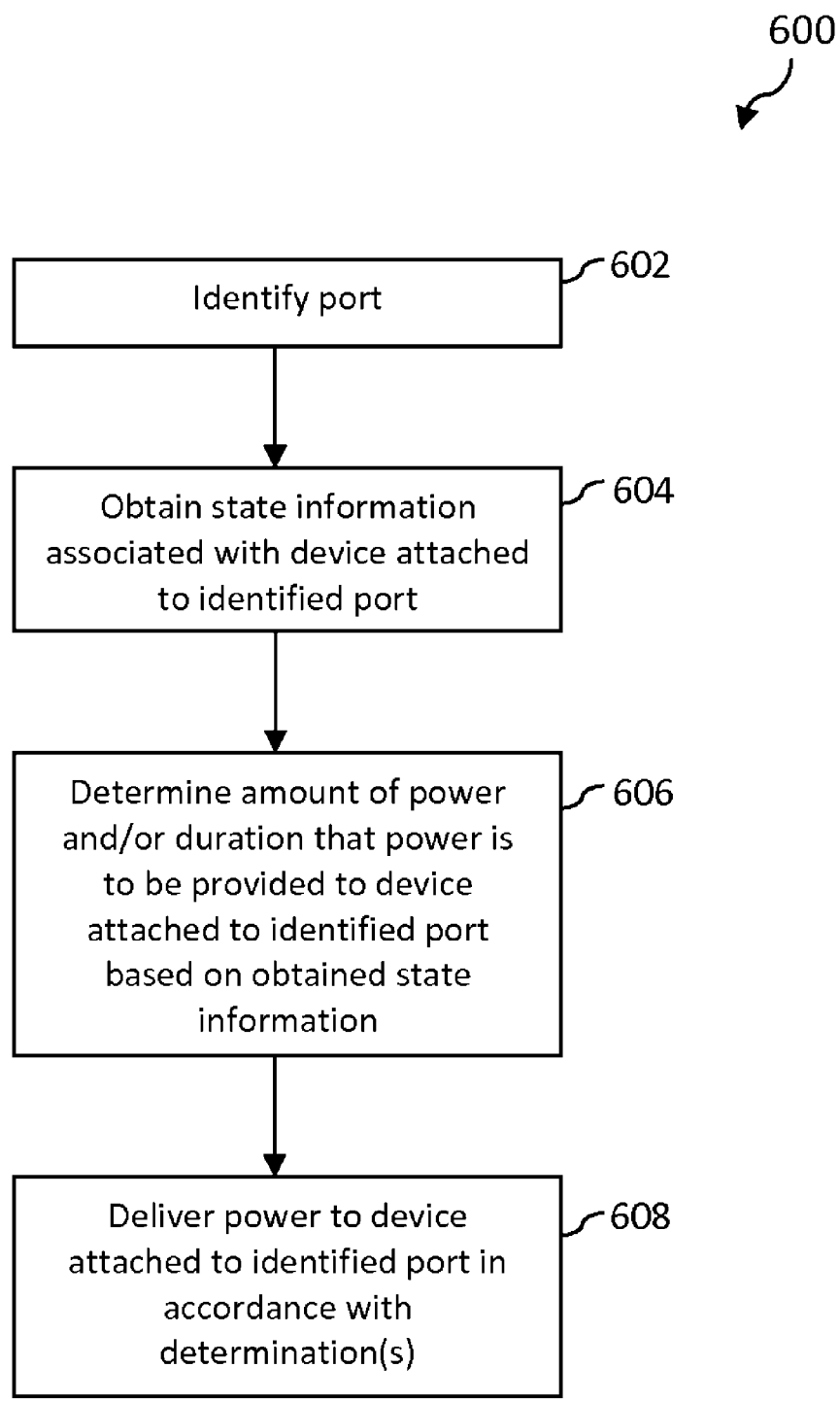
FIG. 6 depicts a flowchart of a method for selectively providing power to one or more remote devices by a PoE-capable switch based on state information in accordance with an embodiment of the present invention.

FIG. 6 illustrates a flowchart 600 of a method for selectively providing power to one or more remote devices by a PoE-capable switch in accordance with an alternate embodiment of the present invention. In the embodiment depicted in FIG. 6, the power management logic within the PoE-capable switch selectively provides power to the one or more remote devices based on state information obtained for a device attached to a given port of the switch.

The method of flowchart 600 will now be described with further reference to the elements of network system 300, described above in reference to FIG. 3, although the invention is by no means limited to that particular implementation.

The method of flowchart 600 begins at step 602, in which power management logic 322 within switch 302 identifies a particular port on switch 302. At step 604, power management logic 322 obtains state information associated with a device attached to the identified port. This state information may indicate, for example, whether the device attached to the identified port is in an active or an inactive state. For example, if the device is an IP telephone, the state information might indicate that the IP telephone is currently being used to handle an active call. Or, for example, if the device is one that can be placed in a powered-up, powered-down, or standby (i.e., power saving) state, such as certain thin clients or laptops, then the state information might indicate which of these states that device is currently in. State information may be obtained from a variety of sources, including but not limited to the remote device itself, or a server.

At step 606, power management logic 322 determines an amount of power and/or duration that power is to be provided to the device attached to the identified port based on the obtained state information. As noted above, with respect to the amount of power to be provided, the remote device may continue to receive the same amount of power, a lesser amount of power, or no power at all. With respect to the duration that power is to be provided, the remote device may continue to receive power until such time as UPS 308 can no longer provide power to switch 302, or may receive power for only a fixed amount of time.

At step 608, switch 302 delivers power to the remote device attached to the identified port in accordance with the determination(s) made in step 606.

It is to be understood that the method of flowchart 600 could be performed for each port on switch 302 or for only a subset of the ports on switch 302.

The foregoing method of flowchart 600 is advantageous because it allows power management logic 322 to take into consideration the current power needs of a device attached to switch 302 when selectively providing power. This method could be used for example, to turn off power to all ports where an IP telephone is attached that is not in use but to continue to supply power to IP telephones that are in an active state such that they can continue to operate for a fixed period of time (e.g., 2-3 minutes), therefore allowing for a graceful termination of the call by the user. After this, power to even these devices could be terminated. However, this is only one example, and persons skilled in the relevant art(s) will appreciate that numerous other power provisioning schemes may be used based on device state information.

Figure 7:
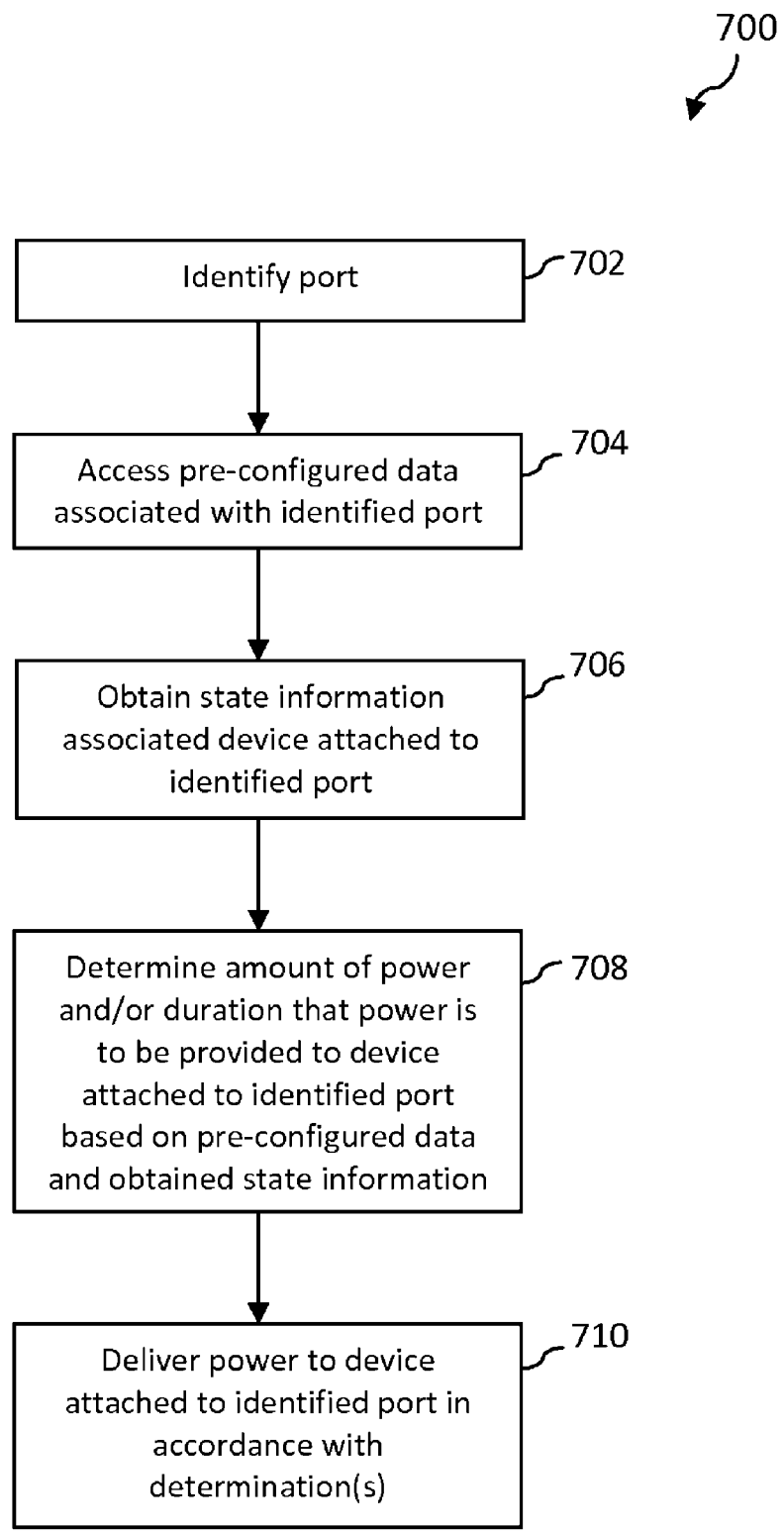
FIG. 7 depicts a flowchart of a method for selectively providing power to one or more remote devices by a PoE-capable switch based on both pre-configured data and state information in accordance with an embodiment of the present invention.

FIG. 7 illustrates a flowchart 700 of a method for selectively providing power to one or more remote devices by a PoE-capable switch in accordance with an alternative embodiment of the present invention. In the embodiment depicted in FIG. 7, the power management logic within the PoE-capable switch selectively provides power to the one or more remote devices based both on pre-configured data that associated with a given port on the switch and on state information obtained for a device attached to the port.

The method of flowchart 700 will now be described with further reference to the elements of network system 300, described above in reference to FIG. 3, although the invention is by no means limited to that particular implementation.

The method of flowchart 700 begins at step 702, in which power management logic 322 within switch 302 identifies a particular port on switch 302. At step 704, power management logic 322 accesses pre-configured data that is associated with the identified port. At step 706, power management logic 322 obtains state information associated with a device attached to the identified port.

At step 708, power management logic 322 determines an amount of power and/or duration that power is to be provided to the device attached to the identified port based on both the accessed pre-configured data and the obtained state information. As noted above, with respect to the amount of power to be provided, the remote device may continue to receive the same amount of power, a lesser amount of power, or no power at all. With respect to the duration that power is to be provided to the device, the remote device may continue to receive power until such time as UPS 308 can no longer provide power to switch 302, or may receive power for only a fixed amount of time.

At step 710, switch 302 delivers power to the remote device attached to the identified port in accordance with the determination(s) made in step 708.

The foregoing method of flowchart 700 advantageously allows power management logic 322 to take into consideration both user-provided configuration information as well as the current power needs of a device attached to switch 302 when selectively providing power. This allows for even more flexible and sophisticated power management by switch 302.

In each of the foregoing methods 500, 600 and 700, a power supply determination is made for a port and then power is supplied to the port in accordance with that determination. In accordance with a further embodiment of the present invention, multiple power supply determinations may be made for a port over time. Thus, for example, a first power supply determination for a port may be made at a first time after receipt of a notification from the UPS and then a second power supply determination may be made for the same port at a second time after the first time. If the power supply determinations change between the first and second times, then the manner in which power is supplied to the port will also change. Additional power supply determinations may subsequently be performed. The power supply determinations may be based on pre-configured data associated with the port, current state information associated with the device attached to the port, as well as other information such as an amount of time that the UPS has been providing power from a secondary source or an amount of power remaining to be supplied to the switch or port.

In one embodiment, power management logic 322 within switch 302 maintains an internal timer that is used to determine when a new power supply determination should be made for the port. The internal timer may track an amount of time that has expired since receipt of the notification by the UPS or since a power savings mode has been entered by power management logic 322, although these examples are not limiting. When the internal timer has reached a predetermined time limit, a new power supply determination is made for the port.

An advantage of the foregoing approach is that it allows the power management scheme implemented by PoE-capable switch 302 to be adapted over time to account for changing factors such as the length of time that the UPS has been running off of secondary power, the amount of power remaining for the switch or port, or the state of the device attached to the port.

D. Alternate Network Systems in Accordance with an Embodiment of the Present Invention In the network system 300 of FIG. 3 and in the associated methods described in reference to FIGS. 4-7, all power management is handled by power management logic 322 within switch 302. In these embodiments, remote devices 306a-306n are passive in the sense that they do not participate in the overall power management function. Rather, each of devices 306a-306n is provided a certain amount of power for a certain amount of time based on determinations made by power management logic 322 alone.

Figure 8:
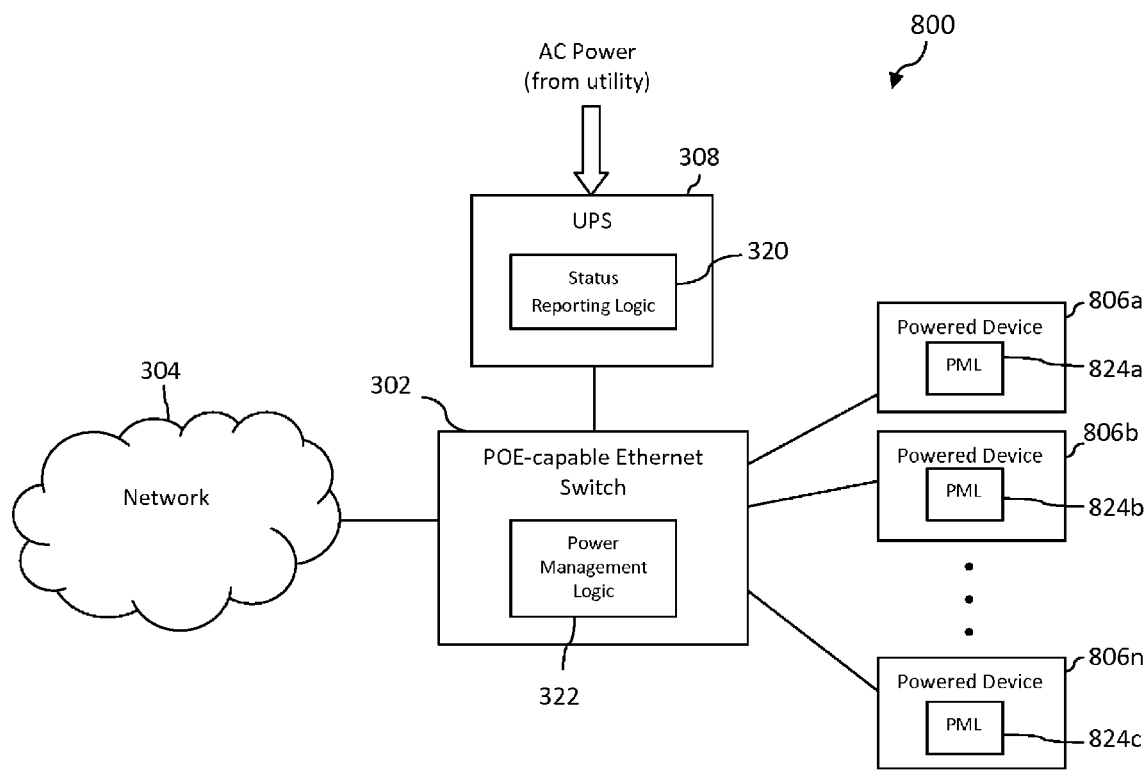
FIG. 8 is a block diagram of a network system in accordance with an alternate embodiment of the present invention in which a PoE-capable switch and remote devices attached thereto jointly participate in a power management function.

FIG. 8 is a block diagram of a network system 800 in accordance with an alternate embodiment of the present invention in which the remote devices attached to the PoE-capable switch participate in the power management function. As shown in FIG. 8, PoE-capable switch 302 is connected to a plurality of remote devices 806a-806n, each of which includes respective power management logic 824a-824n. These devices may be thin clients, laptop computers, or any other devices that include their own power management systems. For example, many laptop computers include power management logic that allows the laptop to turn off certain functions when operating solely on battery power or when the laptop has gone unused for some predetermined length of time.

In accordance with the embodiment illustrated in FIG. 8, power management logic 322 within switch 302 is configured to communicate with one or more of remote devices 806a-806n to cause the power management logic within each remote device to implement one or more power saving features.

Figure 9:
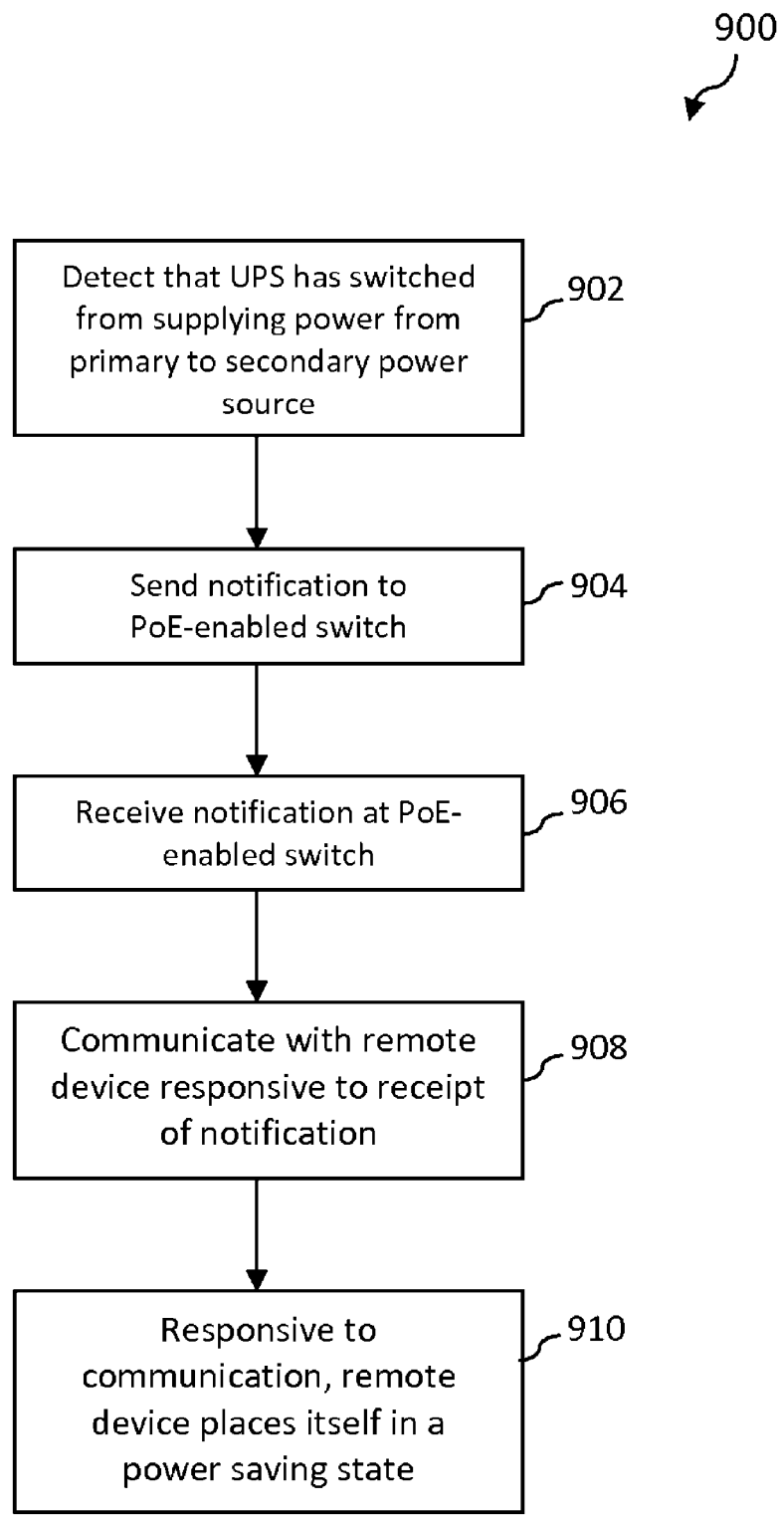
FIG. 9 depicts a flowchart of a method for providing improved power management in a PoE-enabled switch in accordance with an embodiment of the present invention in which the PoE-capable switch and remote devices attached thereto jointly participate in a power management function.

A method for performing power management in accordance with a system such as network system 800 of FIG. 8 will now be described. In particular, FIG. 9 depicts a flowchart 900 of a method for providing improved power management in a PoE-enabled switch in accordance with an embodiment of the present invention in which the PoE-capable switch and remote devices attached thereto jointly participate in a power management function. Although the method of flowchart 900 will be described with reference to the elements of network system 800, the invention is by no means limited to that particular implementation.

As shown in FIG. 9, the method of flowchart 900 begins at step 902 in which status reporting logic 320 of UPS 308 detects that UPS 308 has switched from supplying power to PoE-capable switch 302 from a primary power source, such as utility-supplied AC power, to a secondary power source, such as one or more batteries internal to UPS 308.

At step 904, responsive to detecting that UPS 308 has switched from supplying power from a primary to a secondary power source, status reporting logic 320 transmits a notification to PoE-enabled switch 302. At step 906, PoE-capable switch 302 receives the notification from UPS 308.

At step 908, power management logic 322 within switch 302 communicates with one of remote devices 806a-806n responsive to the receipt of the notification in step 906. This communication may comprise one-way communication from switch 302 to the remote device or bidirectional communication between switch 302 and the remote device.

At step 910, power management logic within the remote device places itself in a power saving state responsive to the communication that took place in step 908. The power saving state may be any of a variety of power saving states available to the remote device based on the capabilities of the power management logic internal to the remote device. For example, the remote device may be able to place itself in a power down mode or a low power mode. The remote device may further be able to place itself in a low power mode by turning off or dimming a display associated with the remote device, slowing down a microprocessor internal to the remote device, switching from high-speed to low-speed network communication, or the like. The power savings mode that is entered into by the remote device may be selected by the remote device itself or may be selected by switch 302 during the communication that took place in step 908.

The foregoing method of flowchart 900 is advantageous in that it allows each remote device to use its own unique power management capabilities to conserve power during a period of time when the power supply to the PoE-capable switch is limited or failing. This has the effect of prolonging the period of time that the PoE-capable switch can operate off of the limited or failing power supply. Furthermore, this method may be used in conjunction with the selective power providing methods of FIGS. 4-7 to increase the power available for critical devices attached to the PoE-capable switch.

Figure 10:
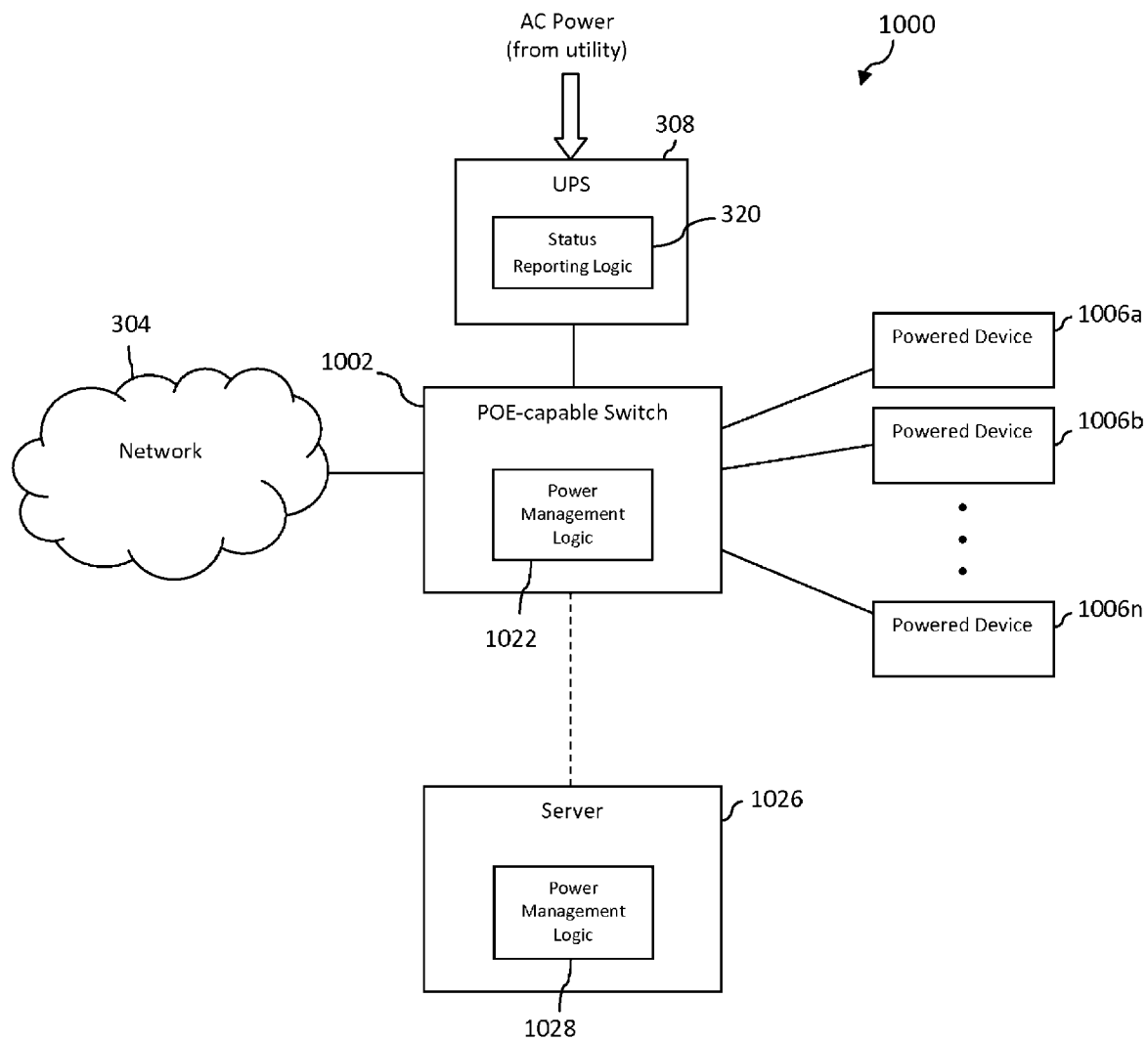
FIG. 10 is a block diagram of a network system in accordance with a further embodiment of the present invention in which the power management function is implemented in a distributed fashion between a PoE-capable switch and a server communicatively coupled thereto.

In the embodiments described above, the power management function is implemented by either a PoE-capable switch alone or by a PoE-capable switch in conjunction with powered devices attached thereto. FIG. 10 depicts a network system 1000 in accordance with a further embodiment of the present invention in which the power management function is implemented in a distributed fashion between a PoE-capable switch 1002 and a server 1026 that is capable of communicating with PoE-capable switch 1002. Server 1026 may comprise a management or administrative server, although the invention is not so limited.

In accordance with the embodiment depicted in FIG. 10, any of the functions attributed above to power management logic 322 of switch 302 (as described above in reference to network systems 300 and 800), except for the actual delivery of power to the remote devices attached to the PoE-capable switch, may be implemented solely by power management logic 1028 within server 1026 or jointly by power management logic 1028 within server 1026 and power management logic 1022 within PoE-capable switch 1002. For example, power management logic 1028 within server 1026 may maintain all pre-configured data and/or current state related to the ports of switch 1002 and the devices attached thereto. This information may then be used by power management logic 1022 and/or 1028 to make determinations concerning how power is selectively provided to those devices.

In accordance with one implementation of the present invention, upon receipt of a notification from UPS 308, PoE-capable switch 1002 sends a message to server 1026. Upon receipt of the message, power management logic 1028 within server 1026 determines how PoE-capable switch 1002 should selectively supply power to remote devices 1006a-1006n. Server 1026 then sends instructions to PoE-capable switch 1002 based on this determination. Responsive to the receipt of the instructions from server 1026, PoE-capable switch 1002 selectively supplies power to remote device 1006a-1006n in accordance with the instructions. However, this implementation is described by way of example only. Other methods of distributing the power management function between PoE-capable switch 1002 and management server 1028 will be readily appreciated by persons skilled in the relevant art(s).

Figure 11:
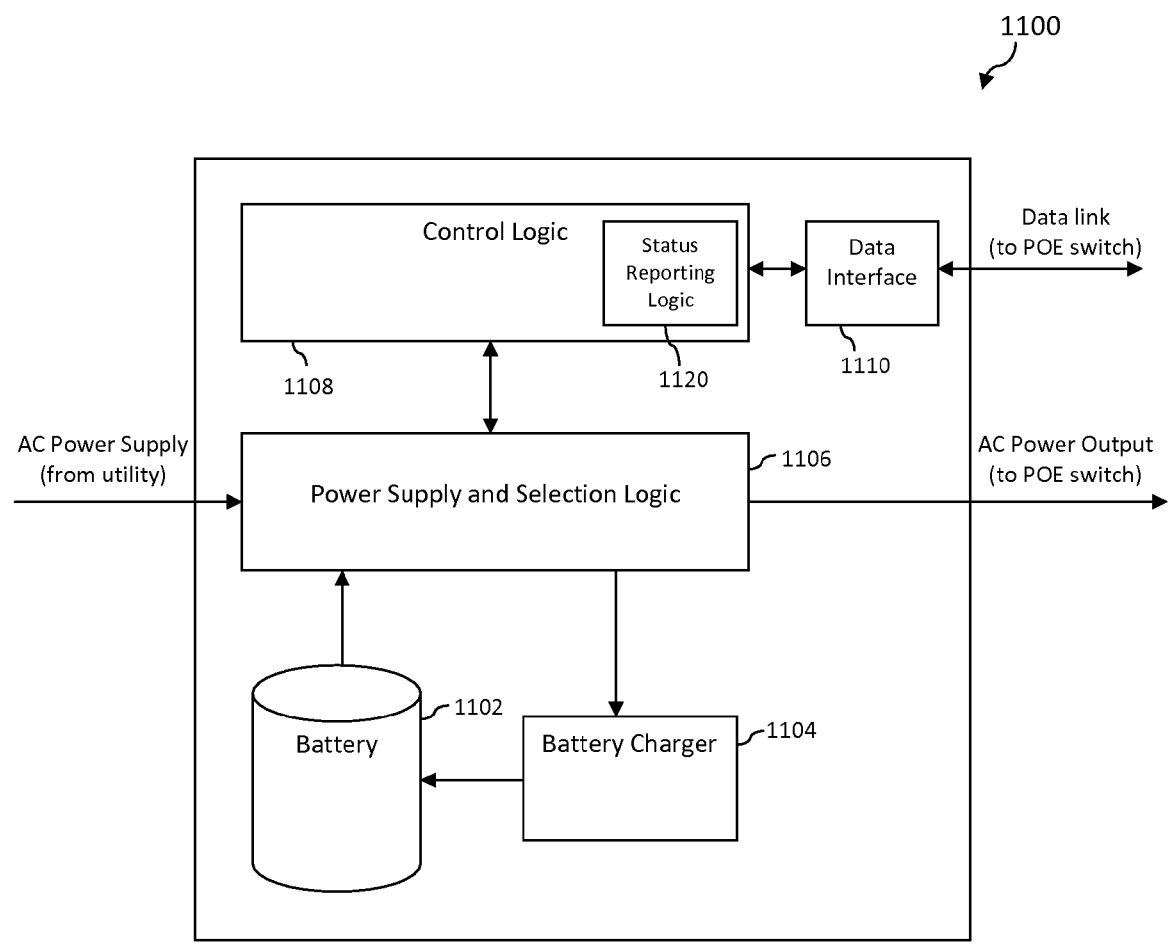
FIG. 11 is a block diagram of a UPS in accordance with an embodiment of the present invention.

E. Example Uninterruptable Power Supply (UPS) in Accordance with an Embodiment of the Present Invention FIG. 11 is a block diagram of a UPS 1100 in accordance with an embodiment of the present invention. As shown in FIG. 11, UPS 1100 includes power supply and selection logic 1106 that is connected to both an external AC power source (e.g., a utility) as well as to an internal battery 1102. Power supply and selection logic 1106 is configured to selectively output AC power derived from one of these sources to a device connected to UPS 1100. Power supply and selection logic 1106 is also configured to provide power derived from the external AC power source to a battery charger 1104, which operates to charge internal battery 1102.

In one embodiment, power supply and selection logic 1106 treats the external AC power source as the primary source of power and provides power derived from internal battery 1102 only when the external AC power source is disrupted. In an alternate embodiment, power supply and selection logic 1106 treats internal battery 1102 as the primary source of power and provides power derived from the external AC power supply only when the power supply from internal battery 1102 is disrupted.

Various aspects of the operation of power supply and selection logic 1106 are controlled by control logic 1108. Control logic 1108 is also configured to communicate information to an external device over a data interface 1110. Control logic 1108 may be implemented in hardware using analog and/or digital circuits, in software, through the execution of instructions by one or more general purpose or special-purpose processors, or as a combination of hardware and software. Data interface 1110 may be any type of standard or proprietary interface for communicating data between devices, including but not limited to a wired interface such as an RS-232 interface, a USB interface, or an Ethernet interface, or a wireless interface such as any IEEE 802.11 interface or a Bluetooth® interface.

As shown in FIG. 11, control logic 1108 also includes status reporting logic 1120. As discussed above in reference to network system 300 of FIG. 3 and flowchart 400 of FIG. 4, status reporting logic 1120 is configured to detect when UPS 1108 has switched from supplying power from its primary power source to its secondary power source and, responsive to detecting this, to transmit a notification to an external device via data interface 1110.

It is noted that UPS 1100 is presented herein by way of example only and is not intended to limit the present invention. Other UPS implementations will be readily apparent to persons skilled in the relevant art(s) and such other implementations are within the scope and spirit of the present invention. For example, and without limitation, embodiments of the present invention may be implemented using any type of standby UPS, ferroresonant standby UPS, line-interactive UPS, or online UPS.

Figure 12:
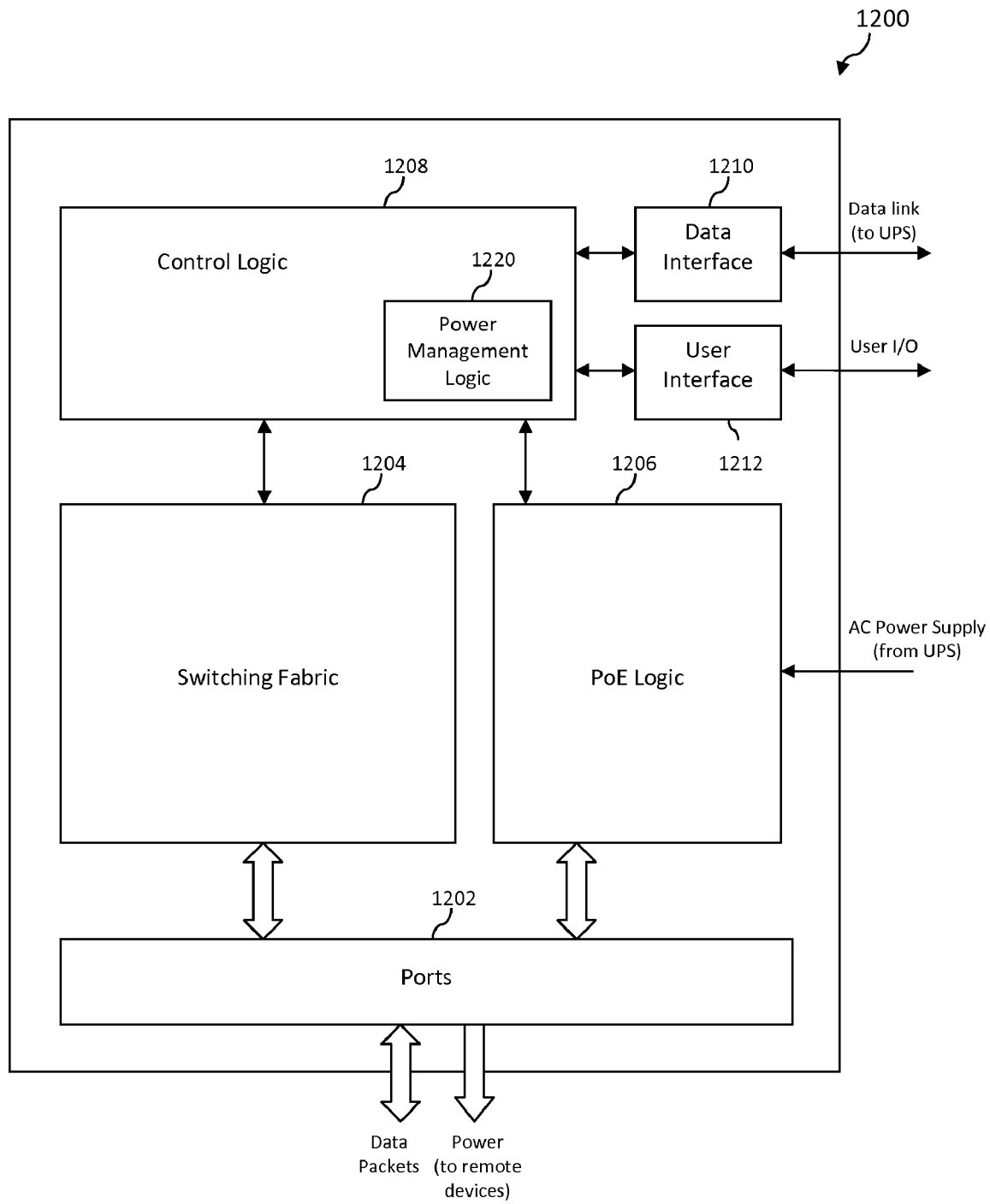
FIG. 12 is a block diagram of a PoE-capable switch in accordance with an embodiment of the present invention.

F. Example PoE-capable Switch in Accordance with an Embodiment of the Present Invention FIG. 12 is a block diagram of a PoE-capable switch 1200 in accordance with an embodiment of the present invention. As shown in FIG. 12, switch 1200 includes a plurality of ports 1202 each of which is connected to the other via a switching fabric 1204. Switching fabric 1204 is also connected to control logic 1208. In operation, data units (e.g., packets or frames) are received and optionally buffered on one or more input ports of ports 1202. Control logic 1208 schedules the serving of data units received by these input ports in accordance with a predetermined scheduling algorithm. Data units are then served to switching fabric 1204, which routes them to an appropriate output port among ports 1202 based on, for example, a destination address of each data unit. The output ports receive and optionally buffer data units from switching fabric 1204, and then transmit them on to a destination device.

As also shown in FIG. 12, switch 1200 also includes PoE logic 1206, which is connected to control logic 1208, an external AC power supply, and the plurality of ports 1202. PoE logic 1206 operates under the control of control logic 1208 to supply power derived from the AC power supply to any of the plurality of ports 1202. Such power is then provided to a device attached to the port over the same Ethernet cable that is used to provide data units to the device. In an embodiment, PoE logic 1206 is configured to comply with the IEEE 802.3af standard, although the invention is not so limited.

As noted above, various aspects of the operation of switching fabric 1204 and PoE logic 1206 are controlled by control logic 1208. Control logic 1208 is also configured to communicate with an external device over a data interface 1210 as well as to receive user-provided input, such as configuration data and the like, via a user interface 1212. Control logic 1208 may be implemented in hardware using analog and/or digital circuits, in software, through the execution of instructions by one or more general purpose or special-purpose processors, or as a combination of hardware and software. Data interface 1210 may be any type of standard or proprietary interface for communicating data between devices, including but not limited to a wired interface, such as an RS-232 interface, a USB interface, or an Ethernet interface, or a wireless interface such as any IEEE 802.11 interface or a Bluetooth® interface. User interface 1212 provides a means for a user, such as a system administrator, to reconfigure the switch and adjust operating parameters thereof.

As shown in FIG. 12, control logic 1208 also includes power management logic 1220. As discussed above in reference to network system 300 of FIG. 3 and the flowcharts of FIGS. 4-7, in one embodiment of the present invention, power management logic 1220 is configured to selectively provide power to one or more of ports 1202 in response to receipt of a notification from a UPS over data interface 1210. Power is then provided from the one or more ports to device(s) attached thereto via an Ethernet cable.

In switch 1200, this selective providing of power is carried out by power management logic 1220 through communication with and control of PoE logic 1206. The selective providing of power may include selectively providing power to only a subset of the ports, selectively providing different amounts or levels of power to different ones of the ports, and/or selectively providing power for different durations to different ones of the ports. The determination of which of the ports should receive power, the amount of power provided to each device, and the duration over which power is provided to each device may be made by power management logic 1220 based on a variety of factors or inputs, as described in more detail above.

As further discussed above in reference to system 800 of FIG. 8 and flowchart 900 of FIG. 9, in one embodiment of the present invention, power management logic 1220 is additionally or alternatively configured to communicate with one or more of the remote devices attached to ports 1202 in response to receipt of a notification from a UPS over data interface 1210. In response to this communication, power management logic within the remote device may place itself in a power saving state.

As still further discussed above in reference to system 1000 of FIG. 10, in one embodiment of the present invention, power management logic 1220 is additionally or alternatively configured to communicate with a remote management server to carry out any of the various power management functions described herein, except for the actual delivery of power to the remote devices attached to ports 1202.

It is noted that switch 1200 is presented herein by way of example only and is not intended to limit the present invention. Other switch implementations will be readily apparent to persons skilled in the relevant art(s) and such other implementations are within the scope and spirit of the present invention.

G. PoE-Capable Switch with Power Restoration Capabilities in Accordance with a Further Embodiment of the Present Invention The foregoing description focused primarily on power management techniques that are performed by a PoE-capable switch (alone or in combination with other entities) in response to receiving a notification indicating that a power source of the PoE-capable switch is limited or failing. At some point subsequent to receiving this notification, however, the power source that is limited or failing may be restored. In accordance with a further embodiment of the present invention, the entity providing the notification to the PoE-capable switch may provide a second notification to the switch indicating that the power source is no longer limited or failing. At this point, the PoE-capable switch may perform a series of steps to essentially "reverse" the steps that were performed after receiving the first notification in order to manage and conserve power.

For example, in response to receiving the second notification, the PoE-capable switch may restore power to remote devices to which it denied power after receiving the first notification, provide increased power to remote devices to which it provided reduced power after receiving the first notification, and/or instruct remote devices that it caused to activate one or more power savings features after receiving the first notification to de-activate those features. In this manner, the PoE-capable switch can bring all the remote devices to which it supplies power back into their normal powered states. The order in which power is restored to the remote devices may be determined arbitrarily or in accordance with pre-configured priority information and/or current state information associated with the remote devices or the ports to which they are attached.

H. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for performing power management by a Power over Ethernet (PoE) capable switch, wherein the PoE-capable switch is connected to a plurality of remote devices over respective Ethernet cables and is operable to provide both data and power to each of the plurality of remote devices over the same Ethernet cable, the method comprising:

receiving a notification indicating that a power source of the PoE-capable switch is limited or failing; and responsive to receiving the notification, performing:

obtaining current state information from each of the plurality of remote devices, wherein the current state information associated with each of the plurality of remote devices indicates a power consumption state for a respective remote device, wherein each of the plurality of remote devices can operate in a powered-up, powered-down, or stand-by power consumption state; and selectively providing power to one or more of the plurality of remote devices connected to the PoE-capable switch based on the current state information including a power consumption state for each of the one or more of the plurality of remote devices, wherein selectively providing power to one or more of the plurality of remote devices connected to the PoE-capable switch comprises providing power for different preconfigured fixed time periods to different ones of the plurality of remote devices connected to the PoE-capable switch based on the current state information including a power consumption state for each of the different ones of the plurality of remote devices.

2. The method of claim 1, wherein receiving a notification indicating that a power source of the PoE-capable switch is limited or failing comprises receiving a notification from an uninterruptible power supply (UPS).

3. The method of claim 1, wherein selectively providing power to one or more of the plurality of remote devices connected to the PoE-capable switch comprises providing power to only a subset of the plurality of remote devices connected to the PoE-capable switch.

4. The method of claim 1, wherein selectively providing power to one or more of the plurality of remote devices connected to the PoE-capable switch comprises providing a different amount of power to different ones of the plurality of remote devices connected to the PoE-capable switch.

5. The method of claim 1, wherein selectively providing power to one or more of the plurality of remote devices connected to the PoE-capable switch comprises selectively providing power based on preconfigured data associated with one or more ports of the PoE-capable switch.

6. The method of claim 5, further comprising:

obtaining the preconfigured data from a remote management server.

7. The method of claim 1, wherein selectively providing power to one or more of the plurality of remote devices connected to the PoE-capable switch comprises:
sending a message to a remote server; and
receiving instructions from the remote server responsive to sending the message, the instructions indicating a manner in which to selectively provide power to the one or more of the plurality of remote devices connected to the POE-capable switch.

8. The method of claim 1, wherein selectively providing power to one or more of the plurality of remote devices connected to the PoE-capable switch comprises:
making a first power supply determination for one of the plurality of remote devices and selectively providing power to the one of the plurality of remote devices based on the first power supply determination; and
subsequently making a second power supply determination for the one of the plurality of remote devices and selectively providing power to the one of the plurality of remote devices based on the second power supply determination.

9. A Power over Ethernet (PoE) capable switch, comprising:
a plurality of ports, each of the plurality of ports adapted for connection to a remote device via a respective Ethernet cable;
PoE logic connected to the plurality of ports, the PoE logic controllable to provide power to selected ones of the plurality of ports for delivery to a remote device connected thereto;
control logic connected to the PoE logic and configured to control the operation thereof; and
a data interface connected to the control logic;
wherein the data interface is configured to receive a notification indicating that a power source of the PoE-capable switch is limited or failing, and
wherein the control logic includes power management logic that is configured to:
obtain current state information from one or more remote devices connected to the plurality of ports responsive to receipt of the notification by the data interface, wherein the current state information associated with each of the one or more remote devices indicates a power consumption state for a respective remote device, wherein each of the one or more remote devices can operate in a powered-up, powered-down, or stand-by power consumption state; and
control the PoE logic to selectively provide power to the plurality of ports responsive to receipt of the notification by the data interface and based on the current state information including a respective power consumption state for each of the one or more remote devices connected to the plurality of ports, wherein selectively providing power to the plurality of ports comprises providing power for different preconfigured fixed time periods to different ones of the plurality of ports based on respective power consumption states for each of different ones of the one or more remote devices connected to the different ones of the plurality of ports.

10. The PoE-capable switch of claim 9, wherein the data interface comprises one of an RS232 interface, a universal serial bus (USB) interface, an Ethernet interface, an IEEE 802.11 interface or a Bluetooth® interface.

11. The PoE-capable switch of claim 9, wherein the power management logic is configured to control the PoE logic to provide power to only a subset of the plurality of ports.

12. The PoE-capable switch of claim 9, wherein the power management logic is configured to control the PoE logic to provide a different amount of power to different ones of the plurality of ports.

13. The PoE-capable switch of claim 9, wherein the power management logic is configured to control the PoE logic to selectively provide power to the plurality of ports based on preconfigured data associated with one or more of the plurality of ports.

14. The PoE-capable switch of claim 13, wherein the power management logic is configured to obtain the preconfigured data from a remote management server.

15. A method for performing power management by a Power over Ethernet (PoE) capable switch, wherein the PoE-capable switch is connected to a plurality of remote devices over respective Ethernet cables and is operable to provide both data and power to each of the plurality of remote devices over the same Ethernet cable, the method comprising:
receiving a notification indicating that a power source of the PoE-capable switch is limited or failing;
responsive to receiving the notification, obtaining current state information from each of the plurality of remote devices, wherein the current state information associated with each of the plurality of remote devices indicates a power consumption state for a respective remote device, wherein each of the plurality of remote devices can operate in a powered-up, powered-down, or stand-by power consumption state;
responsive to receiving the notification, selectively providing power to one or more of the plurality of remote devices connected to the PoE-capable switch based on the current state information including a power consumption state for each of the one or more of the plurality of remote devices; and
responsive to receiving the notification, communicating with a selected one of the remote devices to indicate to the selected remote device to implement at least one power saving feature supported by the selected remote device.

16. The method of claim 15, wherein receiving a notification indicating that a power source of the PoE-capable switch is limited or failing comprises receiving a notification from an uninterruptible power supply (UPS).

17. A Power over Ethernet (PoE) capable switch, comprising:
a plurality of ports, each of the plurality of ports adapted for connection to a remote device via a respective Ethernet cable;
PoE logic connected to the plurality of ports, the PoE logic controllable to provide power to selected ones of the plurality of ports for delivery to a remote device connected thereto;
control logic connected to the PoE logic and configured to control the operation thereof; and
a data interface connected to the control logic;
wherein the data interface is configured to receive a notification indicating that a power source of the PoE-capable switch is limited or failing, and
wherein the control logic includes power management logic that is configured to:
obtain current state information from one or more remote devices connected to the plurality of ports responsive to receipt of the notification by the data interface, wherein the current state information associated with each of the one or more remote devices indicates a power consumption state for a respective remote device, wherein each of the one or more remote devices can operate in a powered-up, powered-down, or stand-by power consumption state;

selectively provide power to one or more remote devices connected to the plurality of ports responsive to receipt of the notification by the data interface and based on the current state information including a power consumption state for each of the one or more remote devices; and communicate with a remote device connected to one of the plurality of ports to indicate to the remote device to implement at least one power saving feature supported by the remote device responsive to receipt of the notification by the data interface.

18. The PoE-capable switch of claim 17, wherein the data interface comprises one of an RS232 interface, a universal serial bus (USB) interface, an Ethernet interface, an IEEE 802.11 interface or a Bluetooth® interface.

* * * * *